US012428693B2

(12) United States Patent
Braun et al.

(10) Patent No.: US 12,428,693 B2
(45) Date of Patent: Sep. 30, 2025

(54) STEEL MATERIAL FOR A TORSIONALLY STRESSED COMPONENT, METHOD FOR PRODUCING A TORSIONALLY STRESSED COMPONENT FROM SAID STEEL MATERIAL, AND COMPONENT MADE THEREOF

(71) Applicants: Salzgitter Flachstahl GmbH, Salzgitter (DE); Mannesmann Precision Tubes GmbH, Mülheim an der Ruhr (DE)

(72) Inventors: Michael Braun, Wolfenbüttel (DE); Steffen Zimmermann, Korschenbroich (DE); Karl Meiwes, Cologne (DE)

(73) Assignees: Salzgitter Flachstahl GmbH, Salzgitter (DE); Mannesmann Precision Tubes GmbH, Mülheim an der Ruhr (DE)

( * ) Notice: Subject to any disclaimer, the term of this patent is extended or adjusted under 35 U.S.C. 154(b) by 717 days.

(21) Appl. No.: 17/638,014

(22) PCT Filed: Aug. 27, 2020

(86) PCT No.: PCT/EP2020/073914
§ 371 (c)(1),
(2) Date: Feb. 24, 2022

(87) PCT Pub. No.: WO2021/037948
PCT Pub. Date: Mar. 4, 2021

(65) Prior Publication Data
US 2022/0275468 A1    Sep. 1, 2022

(30) Foreign Application Priority Data
Aug. 30, 2019    (DE) .......................... 102019123334.8

(51) Int. Cl.
*C21D 9/08*    (2006.01)
*B21C 1/00*    (2006.01)
(Continued)

(52) U.S. Cl.
CPC ................ *C21D 9/08* (2013.01); *B21C 1/003* (2013.01); *B21C 37/30* (2013.01); *C21D 6/004* (2013.01);
(Continued)

(58) Field of Classification Search
CPC ........ C21D 9/5735; C21D 1/667; C21D 1/74; C21D 1/25; C21D 1/26; C21D 1/42;
(Continued)

(56) References Cited

U.S. PATENT DOCUMENTS

2013/0056115 A1\*  3/2013  Fukushi ............... C21D 9/0068
148/330
2019/0062861 A1  2/2019  Perrin Guerin

FOREIGN PATENT DOCUMENTS

CN      104962838 A    10/2015
DE      69307393 T2     5/1997
(Continued)

OTHER PUBLICATIONS

Preliminary Report on Patentability of the International Searching Authority in English from corresponding Patent Cooperation Treaty (PCT) Application No. PCT/EP2020/073914, issued Mar. 1, 2022.
(Continued)

*Primary Examiner* — Adil A. Siddiqui
(74) *Attorney, Agent, or Firm* — Gardner, Linn, Burkhart & Ondersma LLP

(57) ABSTRACT

A steel material for a torsionally stressed component, such as a driveshaft, having a minimum tensile strength of 800 MPs, and the microstructure consists of more than 50 vol. % of bainite, having an alloy with the following composition in wt. %: C: 0.02 to 0.3; Si: up to 0.7; Mn: 1.0 to 3.0; P: max. 0.02; S: max. 0.01; N: max. 0.01; Al: up to 0.1; Cu: up to 0.2; Cr: up to 3.0; Ni: up to 0.3; Mo: up to 0.5; Ti: up to 0.2; V: up to 0.2; Nb: up to 0.1; B: up to 0.01; where 0.02≤Nb+
(Continued)

V+Ti≤0.25, residual iron, and smelting impurities. The steel material is inexpensive and has good torsional fatigue strength when used for a torsionally stressed component. The invention also relates to a method for producing a component made of the material and to such a component.

12 Claims, 2 Drawing Sheets

(51) Int. Cl.

| | |
|---|---|
| *B21C 37/30* | (2006.01) |
| *C21D 6/00* | (2006.01) |
| *C21D 8/10* | (2006.01) |
| *C22C 38/00* | (2006.01) |
| *C22C 38/02* | (2006.01) |
| *C22C 38/06* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/58* | (2006.01) |
| *F16C 3/02* | (2006.01) |

(52) U.S. Cl.
CPC .............. *C21D 6/005* (2013.01); *C21D 6/008* (2013.01); *C21D 8/105* (2013.01); *C22C 38/001* (2013.01); *C22C 38/002* (2013.01); *C22C 38/02* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/58* (2013.01); *F16C 3/02* (2013.01); *C21D 2211/002* (2013.01); *F16C 2202/06* (2013.01); *F16C 2204/62* (2013.01); *F16C 2204/74* (2013.01); *F16C 2220/40* (2013.01); *F16C 2240/06* (2013.01); *F16C 2240/60* (2013.01); *F16C 2240/70* (2013.01); *F16C 2326/06* (2013.01)

(58) Field of Classification Search
CPC . C21D 1/60; C21D 1/613; C21D 1/76; C21D 8/0247; C21D 9/573; C21D 9/60; C21D 11/00; C21D 11/005; C23C 2/0038; C23C 2/022; C23C 2/0222; C23C 2/0224; C23C 2/024; C23C 2/40; C23C 2/00344; C23C 2/06; C23G 1/08; C23G 5/04; C23G 5/00; Y02P 10/25
See application file for complete search history.

(56) References Cited

FOREIGN PATENT DOCUMENTS

| | | |
|---|---|---|
| DE | 69718784 T2 | 12/2003 |
| DE | 102007033950 A1 | 1/2008 |
| DE | 102006016099 B4 | 4/2010 |
| DE | 102013009232 A1 | 12/2014 |
| DE | 102015111150 A1 | 1/2017 |
| EP | 2008732 A1 | 12/2008 |
| EP | 2505683 A1 | 10/2012 |
| EP | 2573200 A1 | 3/2013 |
| JP | 5736929 B2 | 6/2015 |

OTHER PUBLICATIONS

International Search Report of the International Searching Authority in English from corresponding Patent Cooperation Treaty (PCT) Application No. PCT/EP2020/073914, indicated completed on Sep. 24, 2020.

Written Opinion of the International Searching Authority from corresponding Patent Cooperation Treaty (PCT) Application No. PCT/EP2020/073914, indicated completed on Sep. 24, 2020.

* cited by examiner

STEEL MATERIAL FOR A TORSIONALLY STRESSED COMPONENT, METHOD FOR PRODUCING A TORSIONALLY STRESSED COMPONENT FROM SAID STEEL MATERIAL, AND COMPONENT MADE THEREOF

CROSS REFERENCE TO RELATED APPLICATION

The present application claims the priority benefits of International Patent Application No. PCT/EP2020/073914, filed Aug. 27, 2020, and claims benefit of German patent application no. 10 2019 123 334.8, filed on Aug. 30, 2019.

BACKGROUND AND FIELD OF THE INVENTION

The invention relates to a steel material for a torsionally stressed component and a method for producing a torsionally stressed component from this steel material, as well as a component therefrom. Such torsionally stressed components typically consist of seamless or welded tubes which can also be cold-drawn.

Such torsionally stressed components, such as drive shafts, cardan shafts, spring rods or torsion springs are mainly used in the automotive and commercial vehicle industry, but there are also possible applications in mechanical engineering. These components are torsionally stressed during the transmission of torque.

The fiercely competitive market means that automobile producers are constantly forced to find solutions for reducing fleet consumption whilst maintaining and improving the highest possible level of comfort and occupant protection. On the one hand, the weight saving of all of the vehicle components plays a decisive role as does, on the other hand, the most favourable possible behaviour of the individual components in the event of high static, dynamic and cyclic stress during operation and also in the event of a crash.

In the case of drive shafts, a current megatrend in the automotive industry is the electrification of the passenger car drive train. Reducing local emissions is one of the big drivers of technology change. The requirement on the drive train components changes according to the characteristics of an electric motor. The use of electric motors allows the direct, continuous as well as short-term provision of high torques. The recuperation technology used in electric motors additionally changes the load collectives as well as load cycles to higher values. The resulting operational loads, e.g. by reason of alternating torsional stresses, increase the requirements on the fatigue properties of the drive train, e.g. of cardan shaft tubes.

Here, but also in the case of motor vehicles driven conventionally with internal combustion engines and with a combination of internal combustion engines and electric motors (hybrid drives), attempts are thus made to further reduce the weight despite the high requirements on the fatigue properties of the drive train and thereby to reduce pollutant emissions during operation. In addition, this reduces material consumption during manufacture and further improves the driving dynamics in motor vehicles.

The suppliers of pre-materials attempt to take this requirement into consideration in that by providing high-strength and ultra-high-strength steels the wall thicknesses can be reduced whilst at the same time achieving improved component behaviour during manufacture and operation. In this context, high-strength and ultra-high-strength steels are understood to be steels having strengths of at least 800 MPa or at least 1000 MPa tensile strength.

Patent specification DE 693 07 393 T2 discloses a forging and a method for the production thereof. The forging which in particular can be a drive shaft is made of a material containing the following elements: C: 0.2-0.6 Si: 1.25-2.0; Mn: 0.5-1.5; V: 0.04-0.2; S: 0-0.2; Cr: 0-0.5; Al: 0-0.1; N: 0-0.04; Nb: 0-0.1; Ti: 0-0.05; with the remainder being iron. The microstructure of this steel alloy is described as predominantly ferritic-pearlitic and a high Si content is described as advantageous for improved fatigue strength.

Laid-open document DE 10 2015 111 150 A1 discloses a steel alloy for chassis and drive components, consisting in wt. % of: C: 0.12-0.22, Mn: 1.5-2.5, Si: 0.45-0.85, Cr: <1.5, V>0.04, B: 0.0010-0.0040, Ti: 0.02-0.1 and optionally Mo 0.6%, with the remainder being iron and smelting-induced impurities. The purpose of this steel alloy is to avoid negative influences on component properties caused by any tempering processes in heat-affected zones during forming or welding due to an increased carbon content. A tempered microstructure consisting of tempered bainite and/or tempered martensite is to form in these heat-affected zones of the chassis or drive component. This microstructure is to make it possible to meet the mechanical characteristic values in accordance with the invention, namely the elasticity limit and tensile strength, while the vehicle component unaffected by heat continues to have sufficient hardness. In accordance with the invention, this microstructure is to be formed by the thermal treatment which produces the heat-affected zone. The microstructure of the material not affected by the heating is not known.

Patent specification DE 697 18 784 T2 discloses a steel with good processability as well as a steel product which is produced therewith and can be inter alia a crankshaft. The steel product has a chemical composition in wt. % of: C: 0.05-0.6; S: 0.002-0.2; Ti: 0.04-1.0; N: <0.008; Nd: 0-0.1; Se: 0-0.5; Te: 0-0.05; Ca: 0-0.01; Pb: 0-0.5; Bi: 0-0.4 Si: 0-1.61; Mn: 0-3.5; P: <0.07; Al: 0-0.05; Cu: 0-1.10; Ni: 0-2.0; Cr: 0-3.0; Mo: 0-0.54; V: 0-0.31; Nb: 0-0.1 B: 0-0.02; with the remainder being iron and unavoidable impurities. The microstructure of the steel product is specified as at least 90% ferrite and pearlite or at least 90% bainite or at least 90% ferrite and bainite. In addition, a preferred embodiment is to also have a microstructure, in which not less than 50% is formed by martensite. Particular attention is paid to the amount of Ti and the ratio of Ti and S, as well as the size of the titanium carbosulphides in the microstructure, the diameter of which should not be larger than 10 μm in order to ensure particularly good processability. A condition of Nb+V+Ti is not established or investigated.

Patent specification DE 10 2006 016 099 B4 discloses a method for producing a hollow transmission shaft which is assembled from shaft portions which follow one another axially. At least one of these shaft portions is made of a steel with the following alloy components in wt. %: C: 0.1-0.3 Si: <0.8, Mn: 1.3-2.5; Cr: 0.8-1.8; Mo: <0.3; Nb: <0.06; Ti: <0.06; B: <0.004; with the remainder being iron and smelting-induced impurities. This steel alloy is said to have the advantage of being air-hardening. Air-hardening steels exhibit a microstructure with high contents of martensite or bainite even at slow cooling rates, which eliminates the disadvantage during welding that a drop in hardness occurs in the region of a heat-affected zone of the weld seam. Overall, shaft portions should advantageously be produced from steels having different properties, in particular different strengths.

Laid-open document DE 10 2007 033 950 A1 discloses workpieces which consist of a steel alloy which contains in mass fractions C: 0.11-0.18 Si: 0.1-0.3; Mn: 1.6-2.2; P: <0.0015; S: <0.010; Cr: 1.25-2.0; N: <0.020; Nb: 0.02-0.06; B: 0.001-0.004; Ti: 0.001-0.050 and the remainder being iron and smelting-induced impurities. A C-content of 0.11 to 0.18% should allow higher strengths and at the same time avoid disadvantages of peritectic solidification, as occur e.g. with C-contents of 0.09 to 0.12%. In addition, the hardenability is adjusted cost-effectively by adding Mn and Cr in interaction with Ti and Nb, and it should be possible to dispense with the cost-intensive alloy elements Mo and V.

With known alloy compositions, it has hitherto not been possible to achieve properties for torsionally stressed components which satisfy the significant requirements for torsional fatigue strength. For example, 200,000 load cycles (LC) are required with torsional moments of ±1200 to ±1800 Nm. A weight reduction with the same or improved component behaviour also cannot be achieved with this.

SUMMARY OF THE INVENTION

The present invention provides a steel material for a torsionally stressed component which is cost-effective and with which the required properties for torsional fatigue strength of the torsionally stressed component are reliably achieved. Furthermore, a suitable, cost-effective method for producing a torsionally stressed component from this steel material is to be provided. Furthermore, a corresponding, weight-reduced component is to be provided. In particular, strengths of more than 800 MPa at yield strengths of more than 700 MPa and torsional fatigue strengths for at least 200,000 LC at torsional moments of ±1200 to ±1800 Nm are to be achieved.

According to an aspect of the teaching of the invention, this object is achieved by a steel material for a torsionally stressed component, in particular a drive shaft, in which the steel material has a predominantly bainitic microstructure with a minimum tensile strength of 800 MPa and the microstructure consists of more than 50% bainite, preferably at least 70%, having the following alloy composition in wt. %: C: 0.02 to 0.3, Si: up to 0.7, Mn: 1.0 to 3.0, P: max. 0.02, S: max. 0.01, N: max. 0.01, Al: to 0.1, Cu: up to 0.2, Cr: up to 1.0, Ni: up to 0.3, Mo: up to 0.5, Ti: up to 0.2, V: up to 0.2, Nb: up to 0.1, B: up to 0.01, wherein 0.02≤Nb+V+Ti≤0.25 is met, with the remainder being iron and smelting-induced impurities.

Within the framework of extensive investigations, it was recognised that a steel material with a predominantly bainitic microstructure has excellent properties in the case of alternating torsional stresses of components which are torsionally stressed. It was further recognised that with the steel material in accordance with the invention, quasi, i.e. approximately, isotropic mechanical properties are achieved, which lead to a significant increase in fatigue strength, especially under the present stresses. In accordance with the invention, more than 50 vol. % bainite is thus present in the steel material.

In an advantageous embodiment for achieving the required mechanical properties, the microstructure has at least 70 vol. %, particularly advantageously at least 90 vol. % bainite and the proportions of residual austenite and martensite and ferrite are <30 vol. %, preferably <10 vol. %.

Compared to known alloy compositions, the required mechanical properties for fatigue strength can be safely achieved with the steel material according to the invention with a microstructure containing more than 50 vol. % bainite. In particular, torsional fatigue strengths of 200,000 LC with torsional moments of ±1200 to ±1800 Nm can be achieved, with strengths of at least 800 MPa and yield strengths of over 700 MPa. At the same time, a weight reduction of over 10% can be achieved.

The use of a bainitic steel material in accordance with embodiments of the invention with the specified alloy composition is greatly advantageous because of the quasi-isotropic mechanical properties for mechanically stressed tubes in general, but particularly for torsionally stressed components, in particular for drive shafts, since the steel strip as the starting material for a welded tube as a component already has a high tensile strength and elongation irrespective of test direction, which are also maintained or are even higher after the component, in particular the drive shaft, is produced from this steel material.

In accordance with an aspect of the invention, the bainitic steel used for the method in accordance with the invention obtains its microstructure via corresponding temperature control already during the production process of the pre-tube (hollow). In the case of hot strip as the starting material, the microstructure can be adjusted e.g. by thermomechanical rolling, and in the case of cold strip e.g. by the annealing process after cold-rolling or during hot-dip galvanising. In the case of the pre-tube produced without seams, the microstructure setting can be adjusted via the temperature control during hot-rolling of the tube.

The particular advantage of using this alloy concept and the bainitic microstructure resides furthermore in a very fine and homogeneous microstructure with more than 50 vol. % bainite and only small proportions of ferrite, residual austenite and martensite, whereby quasi, i.e. approximately, isotropic material properties are achieved, which has a very positive effect on the fatigue strength under alternating torsional stress.

Particularly uniform and homogeneous material properties can be achieved if the steel material for the torsionally stressed component, in particular the drive shaft, has the previously described alloy composition in accordance with the invention in wt. % which is optimized with respect to at least one or more of the alloy elements as follows: C: 0.02 to 0.11 and/or Si: 0.01 to 0.5 and/or Mn: 1.4 to 2.2 and/or Al: 0.015 to 0.1 and/or Cr up to 0.3 and/or Ni: up to 0.2 and/or Mo: 0.05 to 0.5 and/or B: max. 0.004 and/or wherein 0.05≤Nb+V+Ti≤0.2.

In a further improved embodiment of the invention, the steel material has the previously described and already optimised alloy composition in accordance with the invention in wt. % which is additionally optimised with respect to at least one or more of the alloy elements as follows: C: 0.05 to 0.11 and/or Si: 0.1 to 0.5 and/or Mn: 1.5 to 2.0 and/or N: 0.003 to 0.01 and/or Al: 0.03 to 0.1 and/or Ni: up to 0.15 and/or Mo: 0.1 to 0.3 and/or Ti: 0.04 to 0.2.

The addition of nitrogen of at least 0.003 to 0.01 wt. % advantageously provides, in combination with carbon and a minimum titanium content of 0.1 to 0.2 wt. %, a fine-grained microstructure with high strength and toughness properties through the formation of titanium carbonitrides. Moreover, by adding molybdenum in contents of 0.1 to 0.3 wt. %, the precipitations which form are advantageously kept very small.

The method in accordance with the invention for producing a torsionally stressed component, in particular a drive shaft, makes provision that it is produced from a seamless or welded pre-tube, consisting of the steel material in accordance with the invention, wherein the pre-tube has an enlarged diameter and greater wall thickness compared to the required final dimension of the component, and undergoes the following steps: (i) annealing the pre-tube in a furnace in a temperature range of 650 to 850° C. with a furnace dwell time of 5 to 30 min followed by cooling to room temperature, (ii) drawing the pre-tube with at least one drawing procedure to the required final dimension of the component, in which the wall thickness of the pre-tube is reduced by a greater percentage than the outer diameter of the pre-tube, and (iii) optionally adjusting, in particular bend-straightening and separating, to the required length of the component.

The investigations have shown that the best results with regard to the achievable strength of the component can be achieved at the specified annealing temperatures and holding times, as a pronounced yield strength of the steel is advantageously prevented by this annealing treatment.

It has been found to be advantageous if the pre-tube is heated to a temperature in the range of 700 to 800° C., and particularly advantageously in the range of 720 to 780° C.

Another advantageous aspect for achieving the required properties has been found to be that during the drawing process the percentage decrease in the wall thickness of the pre-tube is set higher than the percentage decrease in the diameter of the pre-tube. It has been found to be favourable for a high torsional fatigue strength of the component if the ratio is set to greater than 2:1, particularly advantageously greater than 5:1. The direction-dependent tube property produced by the cold solidification of the material in the drawing process is optimally adjusted according to the torsional stress.

In accordance with an aspect of the invention, the pre-tube can be a tube produced without seams or a welded tube. As a welded tube, it can be produced from a hot strip or cold strip by means of routine welding methods, such as high-frequency induction welding (HFI) or laser beam welding.

Alloy elements are generally added to the steel in order to influence specific properties in a targeted manner. An alloy element can thereby influence different properties in different steels. The effect and interaction generally depend greatly upon the quantity, presence of further alloy elements and the solution state in the material. The correlations are varied and complex. The effect of the alloy elements will be discussed in greater detail hereinafter.

Carbon (C) is considered to be the most important alloy element in steel. Setting a carbon content to at most 2.0 wt. % turns iron first into steel. Despite this fact, the carbon content is drastically reduced during the production of steel. Carbon is interstitially dissolved in the iron lattice owing to its small atomic radius. The solubility is at most 0.02 wt. % in the $\alpha$-iron and is at most 2.06 wt. % in the $\beta$-iron. In dissolved form, carbon considerably increases the hardenability of steel. Owing to the lattice tensions produced in the dissolved state, diffusion processes are hindered and thus conversion processes are delayed. In addition, carbon promotes the formation of austenite, the austenite region is thus expanded at lower temperatures. As the forcibly dissolved carbon content increases, the lattice distortions and thus the strength values of the martensite increase. In addition, carbon is necessary to form carbides. One representative which occurs almost in every steel is cementite (Fe3C). However, substantially harder special carbides can be formed with other metals such as e.g. chromium, titanium, niobium and vanadium. Therefore, it is not only the type but also the distribution and extent of the precipitations which is of crucial significance for the resulting increase in strength. Therefore, in order to ensure, on the one hand, sufficient strength and, on the other hand, good weldability, the minimum C content is fixed to 0.02 wt. % and the maximum C content is fixed to 0.3 wt. %. Preferably, the minimum C content is fixed to 0.02 wt. %, particularly preferably to 0.05 wt. %, and the maximum C content is fixed to 0.11 wt. %.

During casting, silicon (Si) binds oxygen and therefore reduces segregations and impurities in the steel. Moreover, by means of mixed crystal hardening silicon increases the strength and yield strength ratio of the ferrite with the elongation at fracture only decreasing slightly. A further important effect is that silicon shifts the formation of ferrite towards shorter times and therefore permits the production of sufficient ferrite prior to quench hardening. The formation of ferrite causes the austenite to be enriched with carbon and stabilised. In addition, silicon stabilises the austenite in the low temperature range specifically in the region of bainite formation by preventing the formation of carbide (no depletion of carbon). In addition, at high silicon contents strongly adhering scale can form during the hot rolling, said scale possibly impairing the further processing. For the aforementioned reasons, the maximum silicon content is fixed to 0.7 wt. %. Preferably, the minimum Si content is fixed to 0.1 wt. %, particularly preferably 0.1 wt. %, and the maximum Si content is fixed to 0.5 wt. %.

Manganese (Mn) is added to almost all steels for the purpose of desulphurisation in order to convert the noxious sulphur into manganese sulphides. Moreover, by means of mixed crystal hardening manganese increases the strength of the ferrite and shifts the $\alpha$-/$\beta$-conversion towards lower temperatures. A main reason for adding manganese to multiphase steels by alloying is the considerable improvement in the potential hardness increase. By reason of the inhibition of diffusion, the perlite and bainite conversion is shifted towards longer times and the martensite starting temperature is decreased. Therefore, the manganese content is fixed to 1.00 to 3.00 wt. %. The limit values are included. Preferably, the minimum Mn content is fixed to 1.4 wt. %, particularly preferably to 1.5 wt. %, and the maximum Mn content is fixed to 2.2 wt. %, particularly preferably to 2.0 wt. %.

Phosphorous (P) is a trace element from the iron ore and is dissolved in the iron lattice as a substitution atom. Phosphorus increases hardness by means of mixed crystal hardening and improves hardenability. However, attempts are generally made to lower the phosphorus content as much as possible because inter alia it exhibits a strong tendency towards segregation owing to its low diffusion rate and greatly reduces the level of toughness. The attachment of phosphorous to the grain boundaries generally causes grain boundary fractures. Moreover, phosphorous increases the transition temperature from tough to brittle behaviour up to 300° C. During hot-rolling, near-surface phosphorus oxides at the grain boundaries can lead to fracture cracking. However, in some steels owing to the low costs and high increase in strength, it is used in small quantities (<0.1%) as a micro-alloy element. For instance, phosphorus is also partially used as a strength supporting agent in multi-phase steels. For the aforementioned reasons, the phosphorus content is limited to 0.02 wt. %.

Sulphur (S), like phosphorous, is bound as a trace element in the iron ore. It is generally not desirable in steel because it exhibits a strong tendency towards segregation and has a greatly embrittling effect. An attempt is therefore made to achieve amounts of sulphur in the melt which are as low as possible (e.g. by deep vacuum treatment). Furthermore, the sulphur present is converted by the addition of manganese into the relatively innocuous compound manganese sulphide (MnS). The manganese sulphides are often rolled out in lines during the rolling process and function as nucleation sites for the conversion. Primarily in the case of a diffusion-controlled conversion this produces a microstructure of pronounced lines and, in the case of a highly pronounced line formation, can result in impaired mechanical properties (e.g. pronounced martensite lines instead of distributed martensite islands, no isotropic material behaviour, reduced elongation at fracture). For the aforementioned reasons, the sulphur content is limited to 0.01 wt. %.

Aluminium (Al) is generally added to the steel by alloying in order to bind the oxygen and nitrogen dissolved in the iron. Oxygen and nitrogen are thus converted into aluminium oxides and aluminium nitrides. These precipitations can effect grain refinement by increasing the nucleation sites and can thus increase the toughness properties and strength values. Aluminium nitride is not precipitated if titanium is present in sufficient quantities. Titanium nitrides have a lower enthalpy of formation and are thus formed at higher temperatures. In the dissolved state, aluminium, like silicon, shifts the formation of ferrite towards shorter times and thus enables the formation of sufficient ferrite in the multiphase steel. It also suppresses carbide formation and thus leads to a stabilisation of the austenite. The Al content is therefore limited to up to 0.1 wt. %, advantageously to 0.015 to a maximum of 0.10 wt. %, particularly preferably to 0.03 to 0.10 wt. %.

The addition of molybdenum (Mo) is effected, in a similar manner to the addition of chromium, to improve hardenability. The perlite and bainite conversion is shifted towards longer times and the martensite starting temperature is decreased. Moreover, molybdenum considerably increases the tempering resistance so that no losses in strength are to be expected in the zinc bath and effects an increase in strength of the ferrite owing to mixed crystal hardening. The Mo content is optionally added by alloying in dependence upon the dimension, layout configuration and microstructure setting, wherein the minimum addition should then be 0.050 wt. % in order to achieve an effect. For cost reasons, the Mo content is fixed to a maximum of 0.50 wt. %, preferably to 0.05 to 0.5 wt. %, particularly preferably to 0.1 to 0.3 wt. %. If an optional addition of chromium is made, the maximum content is limited to 1.0 wt. %, preferably 0.3 wt. %, for cost reasons.

Titanium (Ti) forms very stable nitrides (TiN) and sulphides ($TiS_2$) at high temperatures. They only partly dissolve in the melt in dependence upon the nitrogen content. If the thus produced precipitations are not removed with the slag, they form quite large particles in the material owing to the high formation temperature and are generally not conducive to the mechanical properties. A positive effect on the toughness is produced by binding of the free nitrogen and oxygen. Therefore, titanium protects other micro-alloy elements such as niobium against being bound by nitrogen. These can then optimally demonstrate their effect. Nitrides which are produced only at lower temperatures by lowering the oxygen and nitrogen content can additionally ensure effective hindrance of the austenite grain growth. Non-removed titanium forms, at temperatures from 1150° C., titanium carbides and can thus effect grain refinement (inhibition of the austenite grain growth, grain refinement by delayed recrystallisation and/or increase in the number of nuclei in α/ß conversion) and precipitation hardening. Titanium is thus added by alloying optionally according to the condition 0.02≤Nb+V+Ti≤0.25 wt. %. Titanium is preferably added by alloying according to the condition 0.05 wt. %≤Nb+V+Ti≤0.20 wt. %. If titanium is selected as an alloy element, the Ti content is a maximum of 0.2 wt. %, preferably 0.04 to 0.2 wt. %, whilst observing the aforementioned sum condition.

The carbide and nitride formation by vanadium (V) first begins at temperatures from about 1000° C. or even after the α/ß conversion, i.e. substantially later than for titanium and niobium. Vanadium thus barely has a grain-refining effect owing to the low number of precipitations provided in the austenite. The austenite grain growth is also not hindered by the late precipitation of the vanadium carbides. Therefore, the strength-increasing effect is based virtually exclusively on the precipitation hardening. One advantage of the vanadium is the high solubility in the austenite and the high volume proportion of fine precipitations caused by the low precipitation temperature. Vanadium is thus added by alloying optionally according to the condition 0.02≤Nb+V+Ti≤0.25 wt. %. Vanadium is preferably added by alloying according to the condition 0.05 wt. %≤Nb+V+Ti≤0.20 wt. %. If vanadium is selected as an alloy element, the V content is a maximum of 0.2 wt. %, whilst observing the aforementioned sum condition.

Niobium (Nb) effects considerable grain refinement because it effects a delay in the recrystallisation most effectively among all micro-alloy elements and additionally impedes the austenite grain growth. However, the strength-increasing effect is to be qualitatively estimated to be higher than that of titanium owing to the increased grain refinement effect and the larger number of strength-increasing particles (removal of the titanium from TiN at high temperatures). Niobium carbides are formed from approximately 1200° C. In conjunction with titanium which, as described above, removes the nitrogen, niobium can increase its strength-increasing effect by forming carbides in the low temperature range (relatively small carbide sizes). A further effect of the niobium is the delay of the α/ß conversion and the reduction of the martensite starting temperature in the dissolved state. On the one hand, this occurs by the solute-drag effect and on the other hand by the grain refinement. This effects an increase in strength of the microstructure and thus also a higher resistance to expansion upon martensite formation. The use of niobium is limited by the quite low solubility threshold. Although this limits the amount of precipitations, it primarily effects an early formation of precipitation with quite coarse particles. The precipitation hardening can thus become effective in real terms primarily in steels with a low C content (higher supersaturation possible) and in hot deformation processes (deformation-induced precipitation). Niobium is thus added by alloying optionally according to the condition 0.02≤Nb+V+Ti≤0.25 wt. %. Niobium is preferably added by alloying according to the condition 0.05 wt. %≤Nb+V+Ti≤0.20 wt. %. If niobium is selected as an alloy element, the Nb content is a maximum of 0.1 wt. %, whilst observing the aforementioned sum condition.

Boron (B) forms nitrides and carbides with nitrogen and with carbon respectively; however, this is generally not desired. On the one hand, only a low amount of precipitations are formed owing to the low solubility and on the other hand these are mostly precipitated at the grain boundaries. In the dissolved state, in very small amounts, boron results in a considerable improvement in the potential hardness increase. The active mechanism of boron is not conclusively resolved. Hypothetically, it can be assumed that boron atoms are preferably attached to the austenite grain boundaries and at that location greatly delay the formation of ferrite upon cooling from the austenite region. As a result, the formation of bainite is promoted. The efficacy of boron is decreased as the grain size increases and the carbon content increases (>0.8 wt. %). An amount over 60 ppm additionally causes decreasing hardenability because boron carbides act as nuclei on the grain boundaries. Boron has an extremely high affinity to oxygen which can lead to a reduction in the boron content in regions near to the surface (up to 0.5 mm). In this context, annealing at over 1000° C. is not recommended. This is also to be recommended because boron can result in an excessive coarse grain formation at annealing temperatures above 1000° C. For the aforementioned reasons, the B content is limited to a value of up to 0.01%, preferably a maximum of 0.004 wt. %.

DETAILED DESCRIPTION OF THE PREFERRED EMBODIMENTS

Comparative tests on the mechanical properties were carried out on steels with the alloy compositions specified in the following Table 1, divided for reasons of space, in wt. %. A first alloy composition in accordance with the invention, called KSG 1000, is indicated with a conventional comparative alloy KSG 800. The remainder of iron and smelting-induced impurities are present as a matter of course but are not specifically listed.

| Material | C | Si | Mn | P | S | N | Al | B |
|---|---|---|---|---|---|---|---|---|
| Invention (KSG 1000) | 0.08 | 0.46 | 1.9 | 0.009 | 0.0010 | 0.0080 | 0.061 | — |
| KSG 800 | 0.22-0.29 | 0.15-0.3 | 1.2-1.5 | max. 0.035 | max. 0.035 | | 0.02-0.08 | max. 0.004 |

| Material | Cu | Cr | Mo | Ni | Nb | Ti | V | Nb + V + Ti |
|---|---|---|---|---|---|---|---|---|
| Invention (KSG 1000) | 0.020 | 0.03 | 0.14 | 0.04 | 0.04 | 0.14 | 0.01 | 0.19 |
| KSG 800 | | max. 0.4 | | | | max. 0.05 | | |

For the investigations into the influence of the various possible final machining states of the component, in particular the drive shaft, hot strip with the alloy composition in accordance with the invention as shown in Table 1 was investigated as the primary material for the tubes. Pre-tubes (hollows) with the dimension (outer diameter×wall thickness in mm) 60×2 in the states "CR1" and "A" according to DIN 10305 part 2 and part 3 were manufactured from this primary material. In addition to the pre-tube produced in this way, the hollows were annealed in accordance with the invention and then cold-drawn with different diameter and wall thickness decreases. In addition, the influence of the bend-straightening process during adjustment was examined.

The results for the mechanical properties are shown in Table 2 below. All values correspond to the specifications for the mechanical properties to be achieved.

| Testing state | Tensile strength $R_m$ [MPa] | Yield strength $R_{p0.2}$ [MPa] | Elongation at fracture A [%] |
|---|---|---|---|
| Strip, transverse | 824 | 764 | 18.5 |
| Strip, longitudinal | 800 | 701 | 21.5 |
| Hollow + CR1 | 837 | 770 | 14.5 |
| Hollow + A | 871 | 608 | 19.5 |
| Tube 50 × 1.7 | 1066 | 1034 | 9.5 |
| Tube 57 × 1.5 | 1080 | 1033 | 7.8 |

Figure 1:
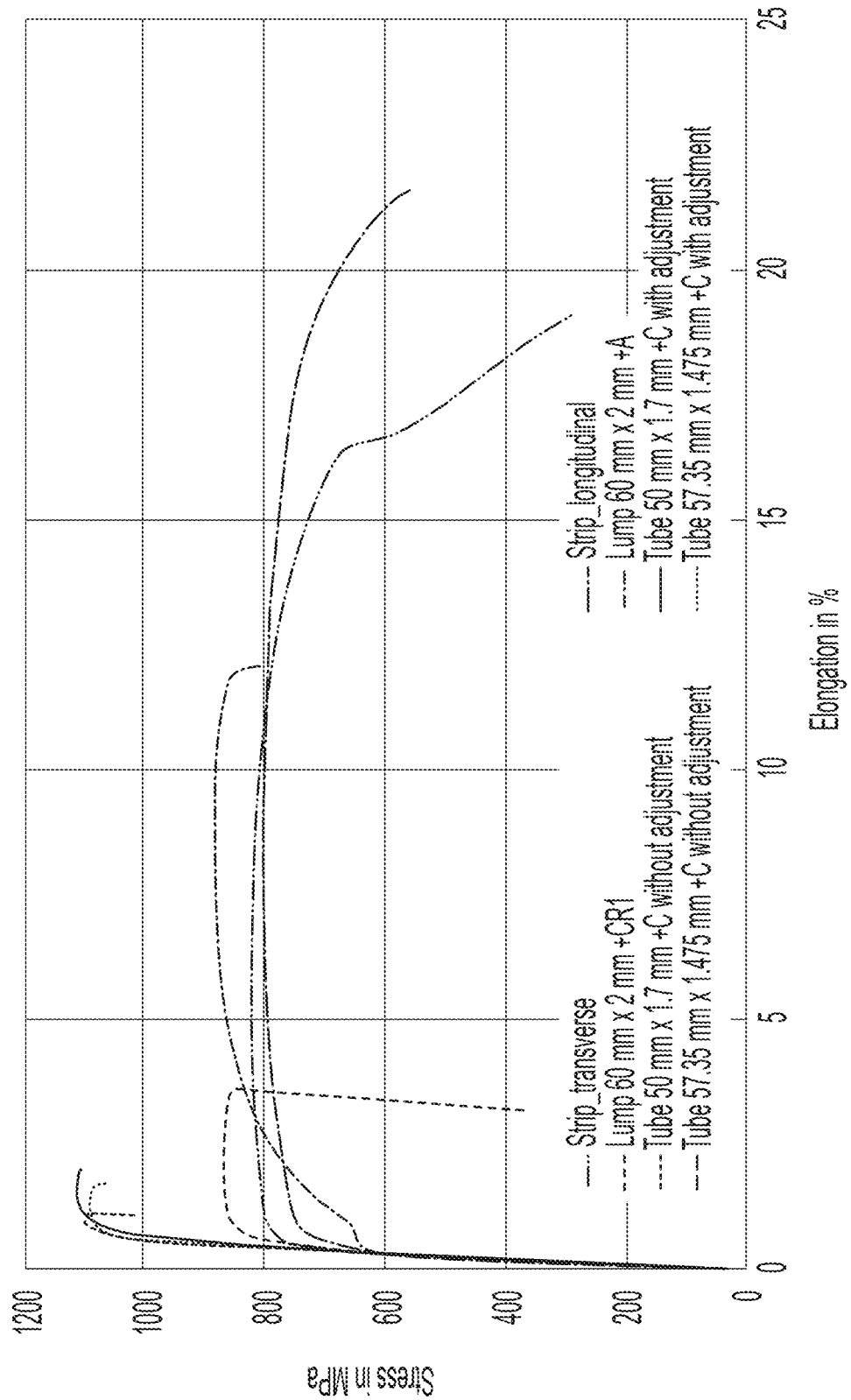
FIG. 1 is a graph of tensile tests on samples according to Table 2 of the specification.

FIG. 1 shows the results of the tensile tests on the samples according to Table 2. As expected, particularly high strengths can be achieved with cold-drawn tubes, wherein the adjusting bend-straightening process does not exert any significant influence.

Figure 2:
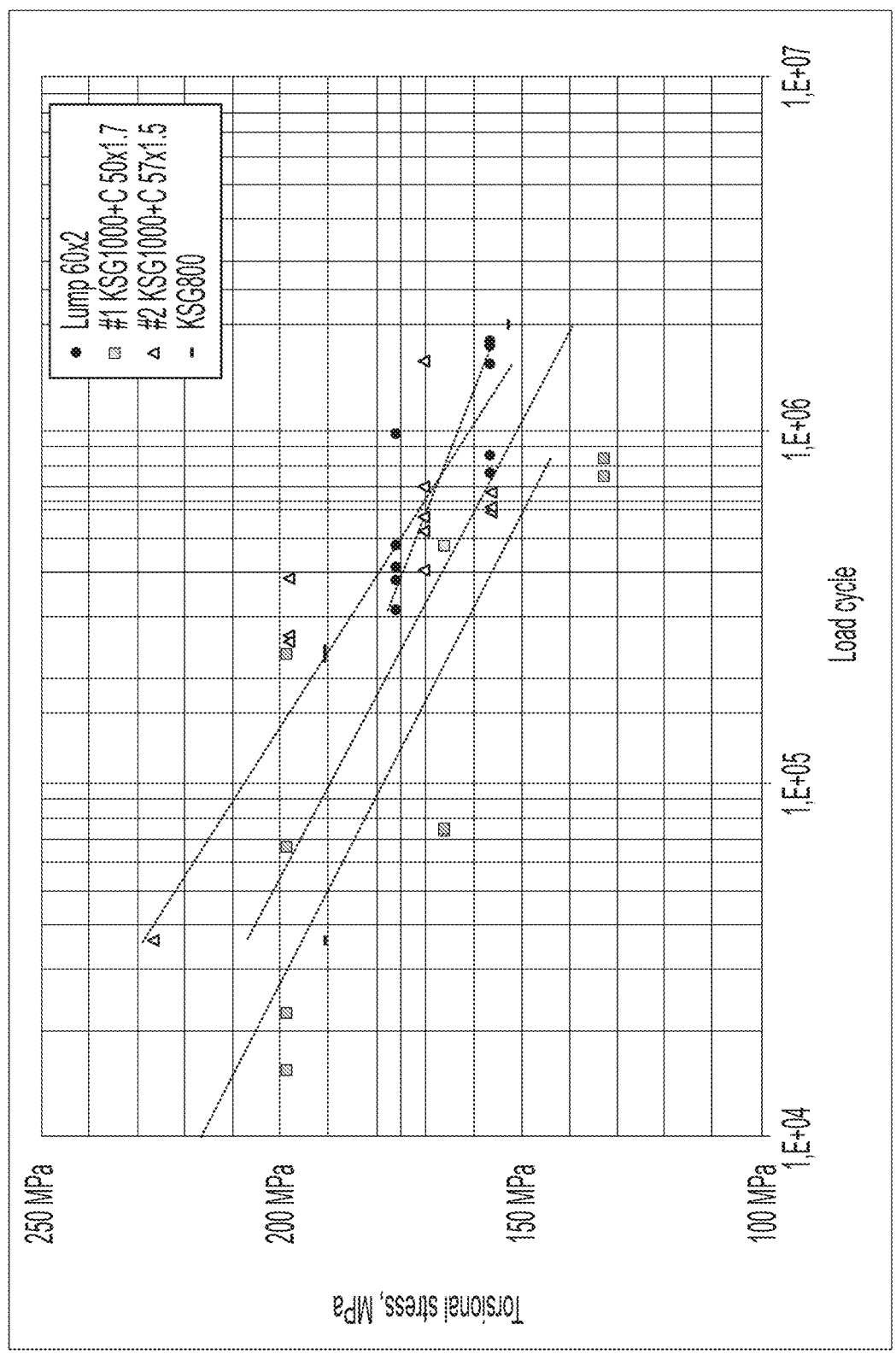
FIG. 2 is a graph of the results of torsion tests.

The results for the torsion tests are illustrated in FIG. 2. Excellent results for fatigue strength are achieved, in particular on 57 mm×1.5 mm cold-drawn tubes. In the case of these tubes, the percentage decrease in the wall thickness of the pre-tube of 25% is higher than the percentage decrease in the diameter of the pre-tube (5%). In contrast thereto, in the case of the 50 mm×1.7 mm tube, the percentage decrease in the wall thickness of the pre-tube is ca. 12% and the percentage decrease in the diameter of the pre-tube is ca. 17%.

A comparison of the results for cold-drawn components, in particular drive shafts, produced from a standard grade KSG 800 and the steel KSG 1000 in accordance with the invention is shown in Table 3 below.

| | KSG800 | KSG1000 |
|---|---|---|
| Yield strength | min. 700 MPa | min. 900 MPa |
| Tensile strength | min. 800 MPa | min. 1000 MPa |
| Elongation (axial) | min. 8% | min. 10% |
| Microstructure | Ferrite-pearlite | Bainite |
| Application example: | | |
| Dimension | OD 60 MM × WT 1.6 mm | OD 57 × 1.5 mm |
| Torque/200,000 LC | 1400 Nm | 1400 Nm |
| Torque/cross-section | 477 × 10³ N/m | 540 × 10³ N/m |
| Weight/metres | 2.30 kg/m | 2.03 kg/m |
| Mass moment of inertia/m | 1964 kgm | 1585 kgm |

The required 200,000 load cycles at a torque of 1400 Nm are achieved with a tube having an outer diameter of 60 mm and a wall thickness of 1.6 mm in standard quality and with a 57 mm×1.5 mm tube consisting of the bainitic steel in accordance with the invention. The resulting advantages for the use of the steel in accordance with the invention, particularly with regard to the weight reduction per metre of tube length and the mass moment of inertia per metre of tube length, are significant.

In addition to the purely mechanical-technological properties, notches have the impact of reducing the service life of components subjected to fatigue stress, in particular torsionally stressed components, such as drive shafts. A distinction must be made between external notches (scratches, grooves on the surface) and internal notches (defects, inclusions, phase boundaries between the same and different phases); the inherent stress condition present in the component also has an influence on the load cycles of the component to be achieved, in addition to the external operating loads of the component.

The outer notches can be reduced by the manufacturing process of the component. The density and size of the internal notches are influenced by the production process of the steel material. The reduction in density and size of defects and inclusions to improve the quality of steel materials is continuously pursued in the steel works. However, the density and type of phase boundaries are dependent upon the set microstructure. In this case, the bainitic microstructure proves to be advantageous compared to classical multiphase microstructures. The reason is that microstructure components of bainite are generally comparatively small and the differences in hardness between the components are comparatively small. As a result, for a given density of phase boundaries, the stress concentration at the phase transitions is lower compared to a classical multiphase microstructure (e.g. dual phase microstructure with ferrite and martensite). A lower stress concentration is to be equated to a lower notch effect. Ideally, a completely bainitic microstructure is formed, which is also retained during further tube production. Purely bainitic microstructures contain less inherent stress than materials with martensitic microstructures; they allow the achievement of very high strength combined with high elongation and toughness. High toughness prevents, in turn, rapid crack growth under recurring loads. In addition to the chemical composition of the steel, a high adjusted bainite proportion is therefore of great importance for achieving the previously described properties of the components, such as e.g. the drive shaft.

The invention claimed is:

1. A tubular component being a drive shaft/cardan shaft, said tubular component produced from a steel material in which the steel material has a minimum tensile strength of 800 MPa and the microstructure comprises more than 50 vol. % bainite, having an alloy with the following composition in wt. %:
C: 0.02 to 0.3;
Si: up to 0.7;
Mn: 1.0 to 3.0;
P: max. 0.02;
S: max. 0.01;
N: max. 0.01;
Al: up to 0.1;
Cu: up to 0.2;
Cr: up to 1.0;
Ni: up to 0.3;
Mo: up to 0.5;
Ti: up to 0.2;
V: up to 0.2;
Nb: up to 0.1; and
B: up to 0.01;
wherein $0.02 \leq Nb+V+Ti \leq 0.25$ is met, with the remainder being iron and melting-induced impurities.

2. The tubular component as claimed in claim 1, wherein the microstructure of the steel material consists of at least 90 vol. % bainite and the proportions of residual austenite and martensite and ferrite are <10 vol. %.

3. The tubular component as claimed in claim 2, wherein with respect to one or more of the following elements the composition of the steel material is in wt. %:
C: 0.02 to 0.11; and/or
Si: 0.01 to 0.5; and/or
Mn: 1.4 to 2.2; and/or
Al: 0.015 to 0.1; and/or
Cr: up to 0.3; and/or
Ni: up to 0.2; and/or
Mo: 0.05 to 0.5; and/or
B: max. 0.004; and/or
wherein $0.05 \leq Nb+V+Ti \leq 0.2$.

4. The tubular component steel material as claimed in claim 3, wherein with respect to the following elements the composition is in wt. %, as follows:
C: 0.05 to 0.11; and/or
Si: 0.1 to 0.5; and/or
Mn: 1.5 to 2.0; and/or
N: 0.003 to 0.01; and/or
Al: 0.03 to 0.1; and/or
Ni: up to 0.15; and/or
Mo: 0.1 to 0.3; and/or
Ti: 0.04 to 0.2.

5. The tubular component as claimed in claim 1, wherein the tubular component is rotated and subjected to torsional stress.

6. The tubular component as claimed in claim 1, wherein the microstructure of the steel material consists of at least 70 vol. % bainite and the proportions of residual austenite and martensite and ferrite are <30 vol. %.

7. The tubular component as claimed in claim 6, wherein with respect to one or more of the following elements the composition of the steel material is in wt. %:
C: 0.02 to 0.11; and/or
Si: 0.01 to 0.5; and/or
Mn: 1.4 to 2.2; and/or
Al: 0.015 to 0.1; and/or
Cr: up to 0.3; and/or
Ni: up to 0.2; and/or
Mo: 0.05 to 0.5; and/or
B: max. 0.004; and/or
wherein $0.05 \leq Nb+V+Ti \leq 0.2$.

8. The tubular component as claimed in claim 7, wherein with respect to the following elements the composition of the steel material is in wt. %, as follows:
C: 0.05 to 0.11; and/or
Si: 0.1 to 0.5; and/or
Mn: 1.5 to 2.0; and/or
N: 0.003 to 0.01; and/or
Al: 0.03 to 0.1; and/or
Ni: up to 0.15; and/or
Mo: 0.1 to 0.3; and/or
Ti: 0.04 to 0.2.

9. The tubular component as claimed in claim 1, wherein with respect to one or more of the following elements the composition of the steel material is in wt. %:
C: 0.02 to 0.11; and/or
Si: 0.01 to 0.5; and/or
Mn: 1.4 to 2.2; and/or
Al: 0.015 to 0.1; and/or
Cr: up to 0.3; and/or
Ni: up to 0.2; and/or Mo: 0.05 to 0.5; and/or
B: max. 0.004; and/or
wherein 0.05≤Nb+V+Ti≤0.2.

10. The tubular component as claimed in claim 9, wherein with respect to the following elements the composition of the steel material is in wt. %, as follows:
C: 0.05 to 0.11; and/or
Si: 0.1 to 0.5; and/or
Mn: 1.5 to 2.0; and/or
N: 0.003 to 0.01; and/or
Al: 0.03 to 0.1; and/or
Ni: up to 0.15; and/or
Mo: 0.1 to 0.3; and/or
Ti: 0.04 to 0.2.

11. The tubular component as claimed in claim 9, wherein the microstructure of the steel material consists of at least 70 vol. % bainite and the proportions of residual austenite and martensite and ferrite are <30 vol. %.

12. The tubular component as claimed in claim 1, wherein the tubular component is configured to be torsionally stressed.

* * * * *

UNITED STATES PATENT AND TRADEMARK OFFICE
CERTIFICATE OF CORRECTION

| | | |
|---|---|---|
| PATENT NO. | : 12,428,693 B2 | Page 1 of 1 |
| APPLICATION NO. | : 17/638014 | |
| DATED | : September 30, 2025 | |
| INVENTOR(S) | : Michael Braun, Steffen Zimmermann and Karl Meiwes | |

It is certified that error appears in the above-identified patent and that said Letters Patent is hereby corrected as shown below:

In the Specification

Column 2:
Between Lines 16 and 17, insert --$\leq$-- after "Mo"

Column 7:
Line 63, "a/B" should be --α/ß--

Signed and Sealed this
Eleventh Day of November, 2025

John A. Squires
*Director of the United States Patent and Trademark Office*